(No Model.)

F. R. COX.
THILL COUPLING.

No. 412,603. Patented Oct. 8, 1889.

Witnesses
J. S. Elliott
H. S. Beall

Francis R. Cox
Inventor
By his Attorneys

UNITED STATES PATENT OFFICE.

FRANCIS R. COX, OF SANDWICH, ILLINOIS.

THILL-COUPLING.

SPECIFICATION forming part of Letters Patent No. 412,603, dated October 8, 1889.

Application filed August 13, 1889. Serial No. 320,602. (No model.)

*To all whom it may concern:*

Be it known that I, FRANCIS R. COX, a citizen of the United States of America, residing at Sandwich, in the county of De Kalb and State of Illinois, have invented certain new and useful Improvements in Thill-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in thill-couplings, the object being to provide a shackle or coupling whereby the thills of carriages or vehicles may be readily attached or detached by simply loosening a nut and raising a bifurcated hook, said hook being adapted to be tightened so as to securely grasp the transverse bolt of the thill-iron and prevent rattling of the parts; and my invention consists in the construction of the shackle, which has formed integral therewith a forwardly-projecting member, the extreme end of which is screw-threaded for the reception of a nut, said shackle having pivoted thereto a hook the ends of which are bifurcated, said parts being adapted to be used in conjunction with a thill-iron having side pieces which carry a bolt or transverse pin, with which the hook pivoted to the shackle engages, as will be hereinafter more fully set forth.

Figure 1:
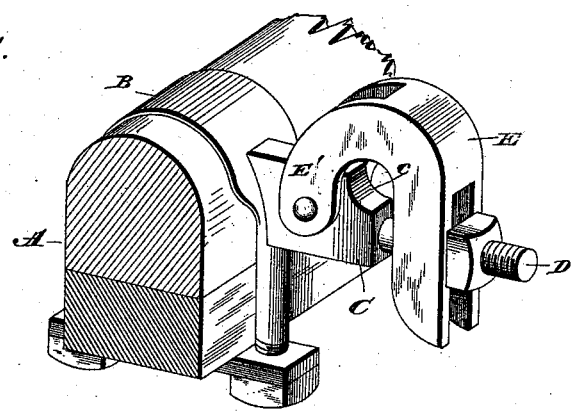
Figure 2:
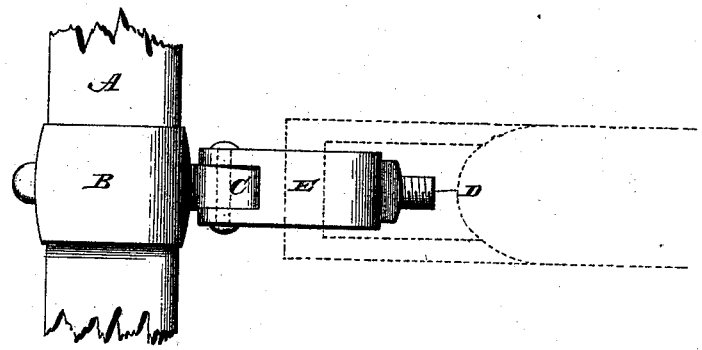
Figure 3:
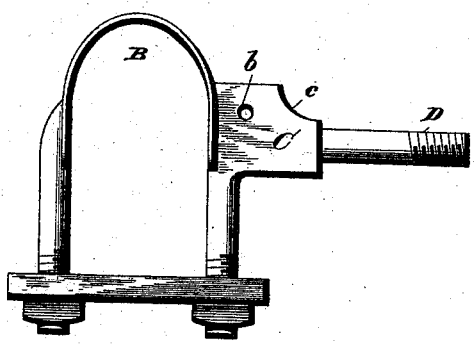
Figure 4:
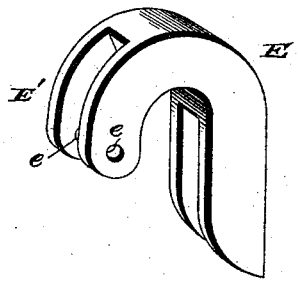

In the accompanying drawings, Figure 1 is a perspective view of a thill-coupling embodying my invention. Fig. 2 is a plan view, and Figs. 3 and 4 are detail perspective views of the shackle and hook detached.

A refers to the front axle of a vehicle, to which the shackle B is secured in the usual manner by nuts, as shown. The shackle has formed integral therewith a forwardly-projecting draw-iron C, which is provided at its upper and forward portion with an ogee curve, as shown at $c$, and below this curved portion $c$, so as to project forwardly, is a bolt D, the end of which is screw-threaded for the reception of a nut $d$.

E refers to a hook, both ends of which extend in the same direction and are bifurcated, so that the ends may lie over the draw-iron and bolt thereof. The rear portion or members of this hook are shorter than the longer members, and said rear portion E' is provided with perforations $e\ e$, through which passes a bolt or rivet for securing the hook horizontally to the draw-iron, said bolt or rivet passing through a perforation $b$ in the draw-iron, said perforation $b$ being located rear of the curved portion $c$ and above the upper portion of the bolt. The rear ends of the hook E depend considerably below the pivot, so that when the front portion of the hook is raised these depending portions will abut against the pins or sides of the iron attached to the thills or poles and raise the same so as to detach it from the draw-iron. This is only necessary should the parts become jammed or wedged in place, as ordinarily simply removing the nut $d$ will release the thills or pole. When the iron attached to the thills or pole has been placed in position and the front end of the hook turned down over the same, the nut is placed upon the bolt, and when screwed home will securely hold the parts in position.

If found desirable, a packing of rubber may be used in connection with the hereinbefore-described device.

It will be observed that the draft is on a line with or below the pivot, so that should the nut become loosened or lost the hook will not rise to release the thills or pole.

The coupling before described is simple in construction, strong, durable, and effective in operation.

I claim—

1. The combination, with a shackle having a draw-iron formed integral therewith and recessed upon its upper side, of a hook pivoted to said draw-iron, both ends thereof being bifurcated to embrace the draw-iron and co-operating with said recessed draw-iron to form a thill-pin bearing, and a thill or pole iron having a transverse pin or bolt which is adapted to be retained between the draw-iron and hook by a suitable retaining-nut bearing against the free end of said hook, the parts being constructed substantially as shown.

2. The combination, with a shackle having a forwardly-projecting draw-iron C and bolt D, said draw-iron having a recess $c$ above the bolt, of a hook E, having bifurcated ends, the rear ends being pivoted to the draw-iron, and a nut $d$, adapted to bear upon the forward bifurcated ends of the hook to prevent movement of the same, substantially as shown, and for the purpose set forth.

In testimony whereof I affix my signature in presence of two witnesses.

FRANCIS R. COX.

Witnesses:
S. B. STINSON,
FRANK H. MCKINDLEY.